(12) United States Patent
Selby et al.

(10) Patent No.: US 7,050,932 B2
(45) Date of Patent: May 23, 2006

(54) METHOD, SYSTEM, AND COMPUTER PROGRAM PRODUCT FOR OUTLIER DETECTION

(75) Inventors: David A. Selby, North Boarhunt Near Fareham (GB); Vincent Thomas, Severna Park, MD (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/226,675

(22) Filed: Aug. 23, 2002

(65) Prior Publication Data

US 2004/0039548 A1 Feb. 26, 2004

(51) Int. Cl.
*G06F 17/60* (2006.01)

(52) U.S. Cl. .................... 702/179; 705/4; 707/100

(58) Field of Classification Search ............ 702/179; 707/1, 3, 5–7, 10, 100, 101, 104.1, 102, 104; 706/21; 700/26, 28–30, 108; 705/4
See application file for complete search history.

(56) References Cited

U.S. PATENT DOCUMENTS

| | | | | |
|---|---|---|---|---|
| 5,445,020 | A * | 8/1995 | Rosensweig | 73/146.2 |
| 5,790,645 | A | 8/1998 | Fawcett et al. | 379/189 |
| 5,832,482 | A | 11/1998 | Yu et al. | 707/6 |
| 5,861,891 | A | 1/1999 | Becker | 345/433 |
| 5,884,305 | A | 3/1999 | Kleinberg et al. | 707/6 |
| 6,003,029 | A | 12/1999 | Agrawal et al. | 707/7 |
| 6,012,058 | A | 1/2000 | Fayyad et al. | |
| 6,034,697 | A | 3/2000 | Becker | 345/433 |
| 6,308,175 | B1 * | 10/2001 | Lang et al. | 707/10 |
| 6,629,095 | B1 * | 9/2003 | Wagstaff et al. | 707/5 |
| 6,633,882 | B1 * | 10/2003 | Fayyad et al. | 707/101 |
| 6,636,860 | B1 * | 10/2003 | Vishnubhotla | 707/100 |
| 2002/0198889 | A1 * | 12/2002 | Vishnubhotla | 707/101 |
| 2003/0101080 | A1 * | 5/2003 | Zizzamia et al. | 705/4 |
| 2003/0144746 | A1 * | 7/2003 | Hsiung et al. | 700/28 |
| 2003/0145000 | A1 * | 7/2003 | Arning et al. | 707/3 |
| 2003/0154044 | A1 * | 8/2003 | Lundstedt et al. | 702/104 |
| 2003/0159106 | A1 * | 8/2003 | Aono et al. | 715/500 |
| 2003/0226100 | A1 * | 12/2003 | Farahat et al. | 715/500 |
| 2004/0010505 | A1 * | 1/2004 | Vishnubhotla | 707/100 |

FOREIGN PATENT DOCUMENTS

WO    WO 99/62007    12/1999

OTHER PUBLICATIONS

Ramaswamy et al., "Efficient Algorithms for Mining Outliers from Large Data Sets," Bell Laboratories, Murray Hill, NJ, pp. 1-20, publication date unknown.

(Continued)

*Primary Examiner*—Carol S. W. Tsai
(74) *Attorney, Agent, or Firm*—John R. Pivnichny; Synnestvedt & Lechner LLP

(57) ABSTRACT

A random sampling of a subset of a data population is taken and the sampled data is used to build a predictive model using a cubic or multiquadric radial basis function, and then "scores" (i.e., predictions) are generated for each data point in the entire data population. This process is repeated on additional random sample subsets of the same data population. After a predetermined number of random sample subsets have been modeled and scores for all data points in the population are generated for each of the models, the average score and variation for each predicted data point is calculated. The data points are subjected to rank ordering by their variance, thereby allowing those data points having a high variance to be identified as outliers.

15 Claims, 8 Drawing Sheets

OTHER PUBLICATIONS

Ng, R., "CASCON '98 Workshop Report Detecting Outliers in Large Data Sets," IBM Technical Report: TR-74.165-m, pp. 1-5 (Apr. 1999).

"Neural Data Mining for Credit Card Fraud Detection," *Proceedings 11 Intl. Conf. on Tools with Artificial Intelligence,* pp. 103-106 (1999).

* cited by examiner

METHOD, SYSTEM, AND COMPUTER PROGRAM PRODUCT FOR OUTLIER DETECTION

BACKGROUND OF THE INVENTION

1. Field of the Invention

This invention relates to the field of data mining. More specifically, the present invention relates to the detection of outliers within a large body of multi-dimensional data.

2. Description of the Related Art

Organizations collect huge volumes of data from their daily operations. This wealth of data is often under-utilized. Data mining is a known technology used to discover patterns and relationships in data. It involves the process of analyzing large amounts of data and applying advanced statistical analysis and modeling techniques to the data to find useful patterns and relationships. These patterns and relationships are used to discover key facts that can drive decision making. This helps companies reap rewards from their data warehouse investments, by transforming data into actionable knowledge and by revealing relationships, trends, and answers to specific questions that cannot be easily answered using traditional query and reporting tools.

Data mining, also known generically as "knowledge discovery," is a relatively young, interdisciplinary field that cross-fertilizes ideas from several research areas, including machine learning, statistics, databases, and data visualization. With its origins in academia about ten years ago, the field has recently captured the imagination of the business world and is making important strides by creating knowledge discovery applications in many business areas, driven by the rapid growth of on-line data volumes.

Until recently, it was highly impracticable to build large, detailed databases that could chronicle thousands, and from a statistical view, preferably millions, of data points related to, for example, consumer transactions or insurance claims. Deriving useful information from these databases (i.e., mining the databases) was even more impractical. With the advent of modern technology, however, building and processing large databases of information has become possible. For example, most organizations now enter all of their important business information into a computer system, and information that is not already entered into the system can be scanned into the system quickly and easily. In consumer transactions, a bar code reader can almost instantaneously read so-called basket data, i.e., when a particular item from a particular lot was purchased by a consumer, the items the consumer purchased, and so on, for automatic electronic storage of the basket data. Further, when the purchase is made with, for example, a credit card, the identity of the purchaser can be almost instantaneously known, recorded, and stored along with the basket data.

Likewise, processing power is now available at relatively inexpensive cost, making the mining of databases for useful information simple and efficient. Such database mining becomes increasingly problematic as the size of databases expand into the gigabyte and even the terabyte range, and much work in the data mining field is now directed to the task of finding patterns of measurable levels of consistency or predictability in the accumulated data.

Fayyad et al. ("From Data Mining to Knowledge Discovery: An Overview," in Chapter 1, *Advances in Knowledge Discovery and Data Mining*, American Association for Artificial Intelligence (1996)) presents a good, though somewhat dated, overview of the field. Bigus (*Data Mining with Neural Networks*, McGraw-Hill (1996)) and Berry and Linoff (*Data Mining Techniques: For Marketing, Sales, and Customer Support*, John Wiley & Sons (1997)), among others, have written introductory books on data mining that include good descriptions of several business applications.

Predictive modeling is a well-known technique used for mapping relationships among actual data elements and then, based on the model derived from the mapping process, predicting the likelihood of certain behavior with respect to hypothetical future actions or occurrences. There are numerous techniques and method for conducting predictive modeling and the specific details of these know methods and techniques are not discussed further herein.

One of the first steps in the process of building predictive models is to review the characteristics (attributes) of data that is to be used. Typically, measures such as the mean, range, and the distribution of the data are considered for each attribute. A judgment is often made about what data values are considered to be "outliers". Outliers are data points that fall outside of the norm.

Generally, there are two kinds of outliers. A value that is identifiably incorrect, e.g., the age of a person being 180 years, is an identifiably incorrect outlier. For modeling purposes, identifiably incorrect outliers are essentially removed from consideration altogether (e.g., they are considered as having a value of "null"), since they represent errant data.

A second type of outlier is a value that is considered extreme, but correct. This type of outlier represents correct data, but data that is so unusual that it inappropriately skews the analysis of the more normal data. For modeling purposes, it may be desired to represent this extreme, correct outlier by some value that is less extreme, to minimize the skewing impact of the outlier on the model. As an example, when analyzing annual incomes of Americans, Bill Gates' income, while accurate, would be considered an outlier relative to the majority of the population. For outliers of this type, a limit may be placed upon the data value (as opposed to removing it from the data set altogether) to "filter out" such correct but statistically misleading data points.

Identifying these types of outliers is relatively simple when considering a single variable at a time (e.g., the age of a person or the annual income of a person) and standard box plots can be used to help identify these outliers. However, it may be desirable to identify an analyze combinations of variables that are outliers, e.g., the age of an insurance customer (a first variable) and the amount of insurance coverage that that person carries (a second variable). There are many reasons why it might be desirable to identify and analyze such multi-variable outliers; they may, for example, represent unusual occurrences such as the existence of fraud.

The original analysis of one variable can be expanded to two variables by plotting their occurrence on a scatter plot. Likewise, the combination of three variables can be visualized in a three-dimensional plot. Beyond three variables, however, a problem exists because there is no dimension beyond the third dimension to use for plotting. In the complex environments that analysts currently strive to manage, there may be many hundreds of potential attributes to use in modeling and thus the "maximum of three variables" approach is inadequate.

Predictive models can be used to identify unusual combinations of inputs exceeding three. A weakness of the traditional modeling approach, however, is that it isn't focused on the goal of the model. As an example, a company may routinely compile a broad range of data related to individuals, e.g., demographic data, interests, hobbies, profession, likes and dislikes, etc., but may wish to create a model focused on characteristics relevant to a narrow subject area, e.g., work-related characteristics. Traditional predictive modeling approaches will use either all the data, including data unrelated to the narrow subject area, or someone must cull through the data and identify which characteristics to include. Thus, all characteristics for which data has been stored will be input to the model unless steps are taken to hand-select only the characteristics of interest. Time and effort considering attributes that will not be used in the model is time wasted and thus leads to inefficiency.

SUMMARY OF THE INVENTION

In accordance with the present invention, a random sampling of a subset of a data population is taken and the sampled data is used to build a predictive model using a cubic or multiquadric radial basis function, and then "scores" (i.e., predictions) are generated for each data point in the entire data population. This process is repeated on additional random sample subsets of the same data population. After a predetermined number of random sample subsets have been modeled and scores for all data points in the population are generated for each of the models, the average score and variation for each predicted data point is calculated. The data points are subjected to rank ordering by their variance, thereby allowing those data points having a high variance to be identified as outliers. By identifying them as outliers, these data points are "flagged" for investigation, thereby simplifying the ability to determine if the data points and the variables with which they are associated should be included in the model or removed from consideration for a particular model and/or making it easier to identify data points that identify a particular activity (e.g., fraud) but which might otherwise go unnoticed in a large body of multi-dimensional data.

DETAILED DESCRIPTION OF THE PREFERRED EMBODIMENTS

The present invention involves predictive modeling. Along with a predicted value, it is highly desirous to identify the confidence that can be placed in that prediction. One method of identifying this confidence is called "bootstrapping" and involves repeatedly taking smaller samples from the complete data population and then using the sample to estimate the population's statistics overall. This allows a mean and a variance for the prediction to be estimated.

Figure 1:
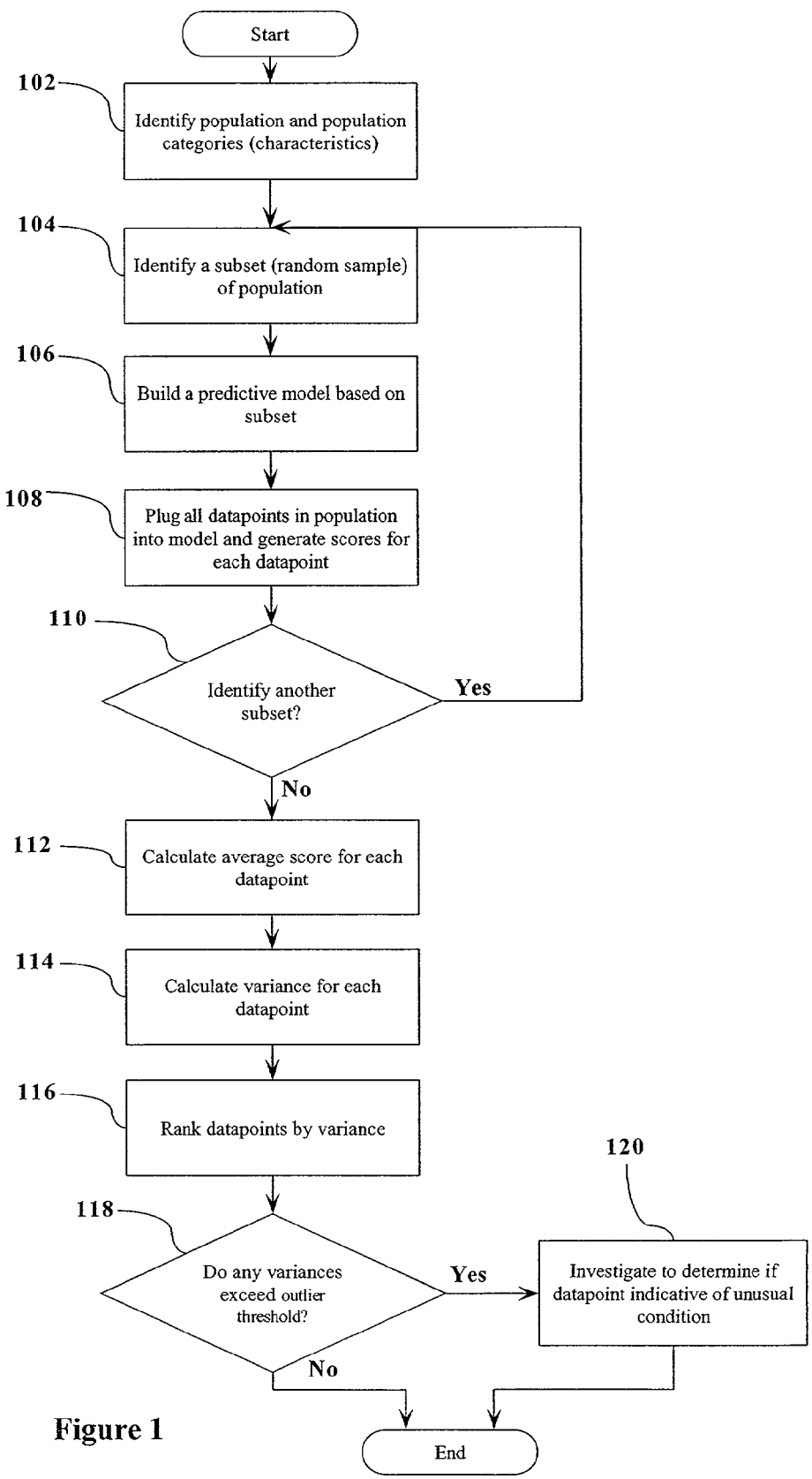
FIG. 1 is a flowchart illustrating an example of steps performed in accordance with the present invention.

FIG. 1 illustrates an example of the steps of the present invention. In accordance with the present invention, bootstrapping is utilized to build multiple models from subsets of the population, and then the models are applied to all of the data points in the population. At step 102, a large population of data points related to a large number (e.g., >3) of variables is identified and then, at step 104, a random sample of a subset of the data points is selected. For each subset so selected, a predictive model is built using a cubic or multiquadric radial basis function (step 106). All of the data points within the entire population are then plugged into the model to generate scores (predicted values) for each data point in the complete data population (step 108). At step 110, a determination is made as to whether or not additional subsets of the entire population are to be selected and modeled. If yes, the process proceeds back to step 104. This process continues until a predetermined number of subsets has been modeled. This process is repeated with more accurate results being achieved as the number of repetitions increases.

Once the desired number of repetitions have been completed, the average score (step 112) and variation (step 114) for each data point is calculated. The data points are then ranked according to their variance (step 116). By rank ordering the data points by their variance, those points that have high variances (e.g., exceed a predetermined "outlier threshold") are identified as candidates for investigation as outliers (steps 118 and 120). Using this technique, a measure of confidence in the predictive value for each data point is also obtained.

The above-described method is able to highlight outliers because, in a sparsely populated region of the multi-dimensional (i.e., multi-variable) space, an instance where the outcome is unusual, as compared with the other instances in the region, causes the model fit to differ significantly, depending on whether the point is included in the sample or not. In a data set having a large number (e.g., >3) of variables, the impact of these outliers is difficult to "see", and thus they cannot be easily investigated. By breaking down the modeling into subsets of the data, applying the models to the entire data set, and then ranking the data points according to their variance, the outliers are more visible, and thus they can be located and investigated to determine whether they are real, incorrect, irrelevant to the analysis, or indicative of something undesirable happening, e.g., fraud.

The method and usefulness of the present invention is demonstrated below using a small data set (six data points) in two dimensions, i.e., one independent variable (age) and one dependent variable (amount of coverage). It is stressed that this example is used for the purpose of explanation only, and that the concept explained in connection with this example is applicable for analyzing data sets containing any number of points in multiple dimensions, especially for dimensions exceeding three. It is noted that from a purely practical standpoint, one would never use this technique in a situation involving 3 or less variables; however, illustrating the techniques for variables exceeding 3 would be voluminous and is unnecessary for understanding the present invention. Further, the specific approach discussed in the example below utilizes radial basis function models. However, it is understood that any models with a non-linear, global-fitting characteristic can also be used.

The data points comprising the complete data set (i.e., the population) for the following example are set forth in Table 1 below. The data points in Table 1 represent the age of life insurance customers A through F and the coverage amount that these customers purchased.

TABLE 1

(Age of insured/amount of coverage)

| Customer Name | Age | Coverage |
|---|---|---|
| A | 23 | 50 K |
| B | 29 | 75 K |

TABLE 1-continued (Age of insured/amount of coverage)

| Customer Name | Age | Coverage |
|---|---|---|
| C | 33 | 150 K |
| D | 37 | 250 K |
| E | 42 | 350 K |
| F | 63 | 100 K |

Figure 2:
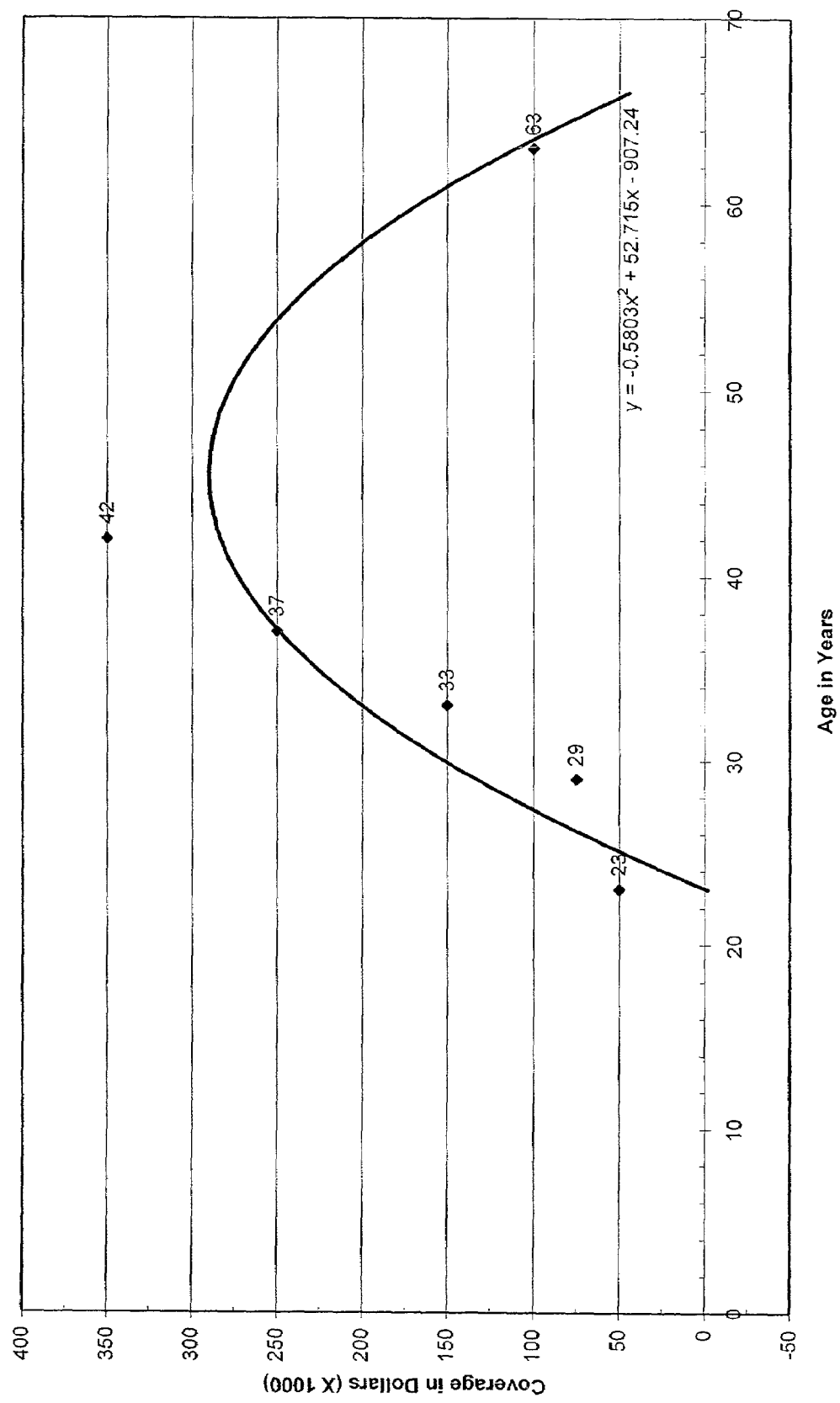
FIG. 2 is a graph of the curve of all data points of Table 1 (applied to a standard quadratic function), which is a list of a sample population and data points pertaining to particular characteristics of the population.

FIG. 2 is a curve of all of the data points of Table 1 applied to a standard quadratic function. By fitting a quadratic function to the data points, the equation representing the model illustrated by the FIG. 2 curve: $-0.58x^2+52.7x-907$, is obtained. The curve of FIG. 2 provides a model to use to estimate the coverage that a particular individual at a particular age might purchase. Thus, from the data in Table 1 and the equation represented by the curve of FIG. 2, it can be estimated that a 58-year-old person would likely purchase approximately $200,000 worth of life insurance.

In addition, analysis of the curve and conjecture based on that analysis might allow a conclusion to be reached that the reason coverage purchased by an individual increases with age up to approximately their mid-forties, and then begins to drop, is because they may begin amassing significant savings at about the mid-forty mark and that life insurance becomes less necessary as the person goes beyond this point. Using conjecture, it might also be concluded that the expense of coverage for someone in their mid-forties and up increases so significantly that they reduce the amount of coverage as the price increases. These conclusions are examples of the types of uses an analyst might make of the model.

Figure 3:
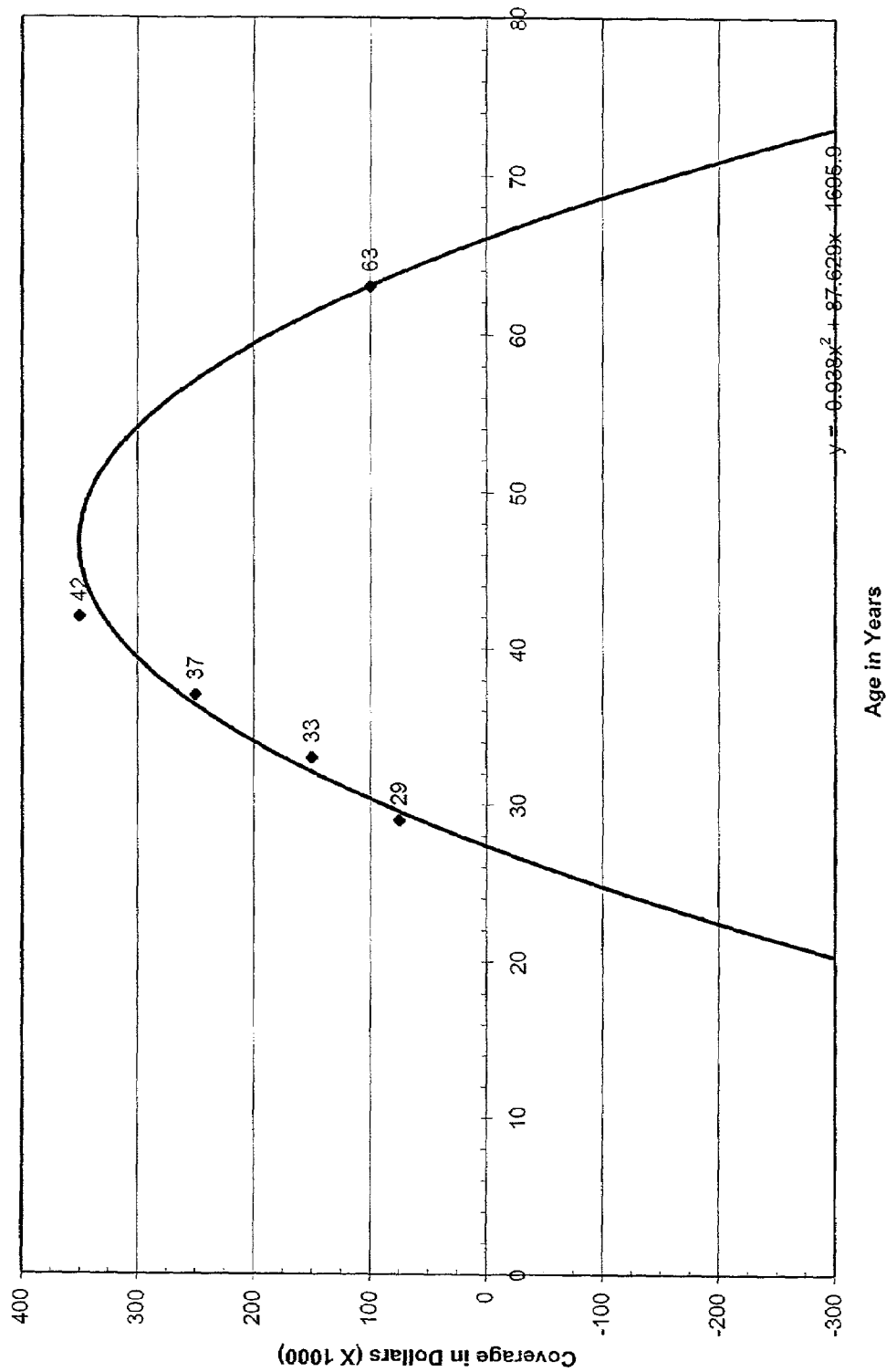
FIGS. 3–8 are graphs of the curves of subsets of the population of Table 1.
Figure 4:
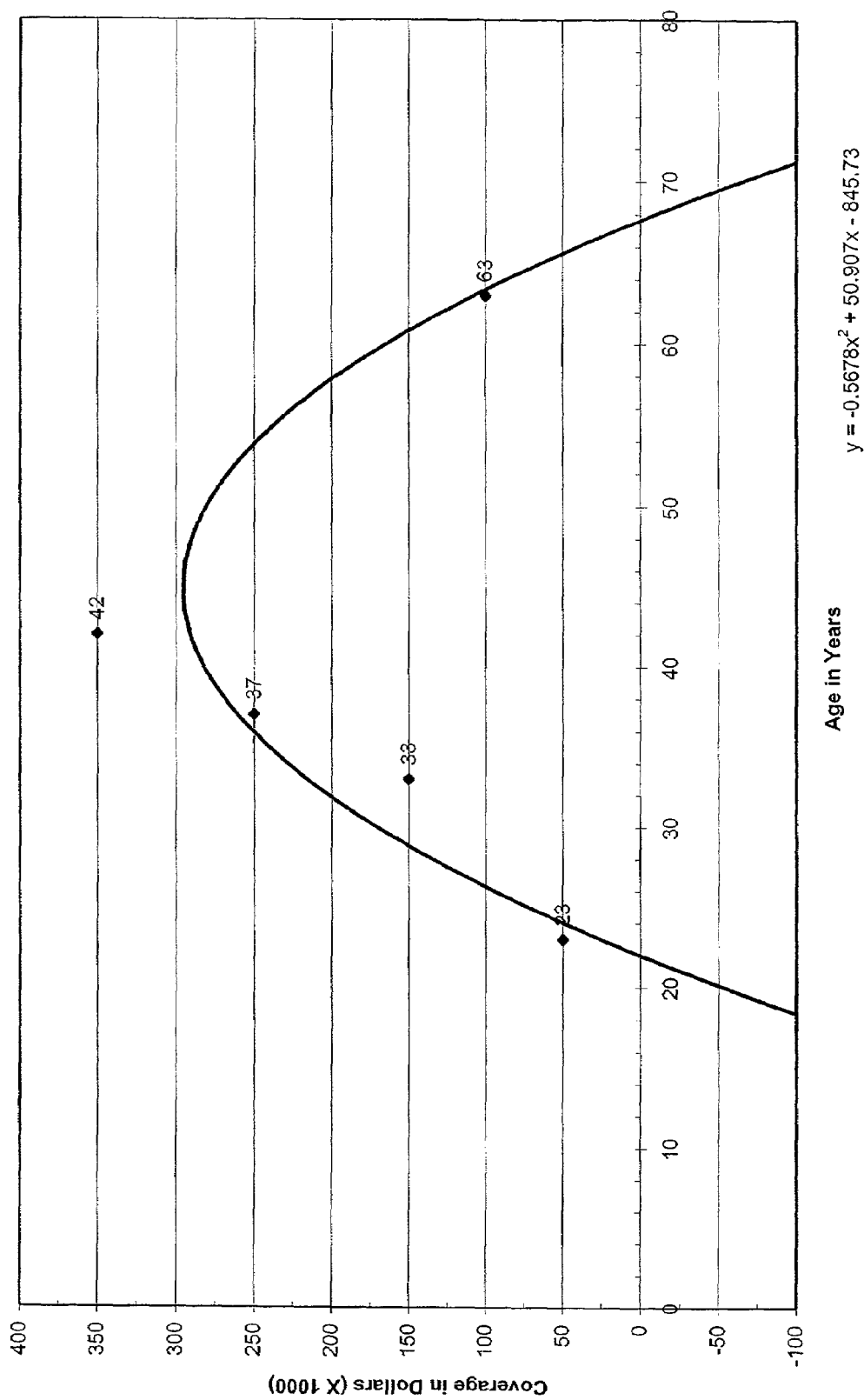
Figure 5:
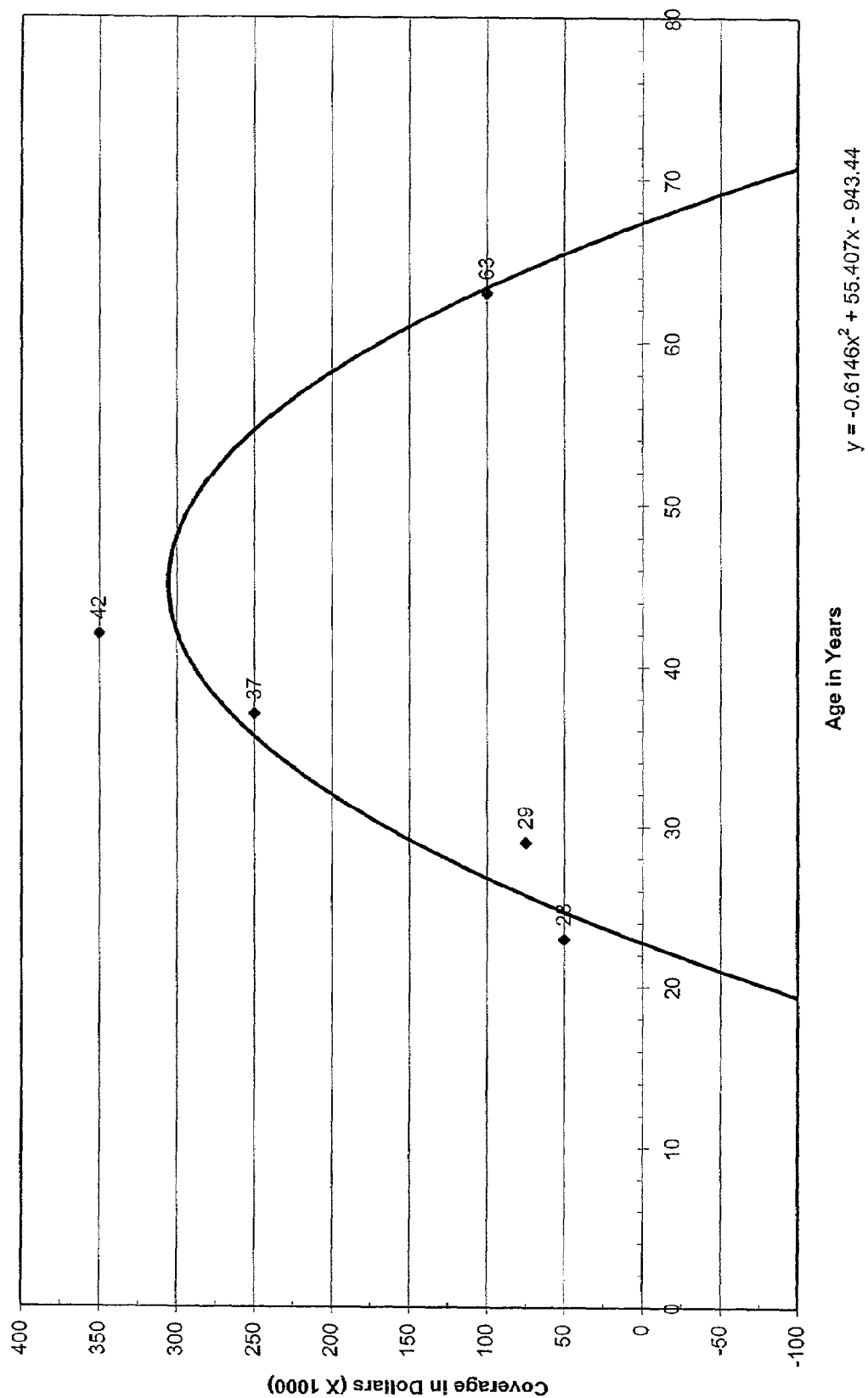
Figure 6:
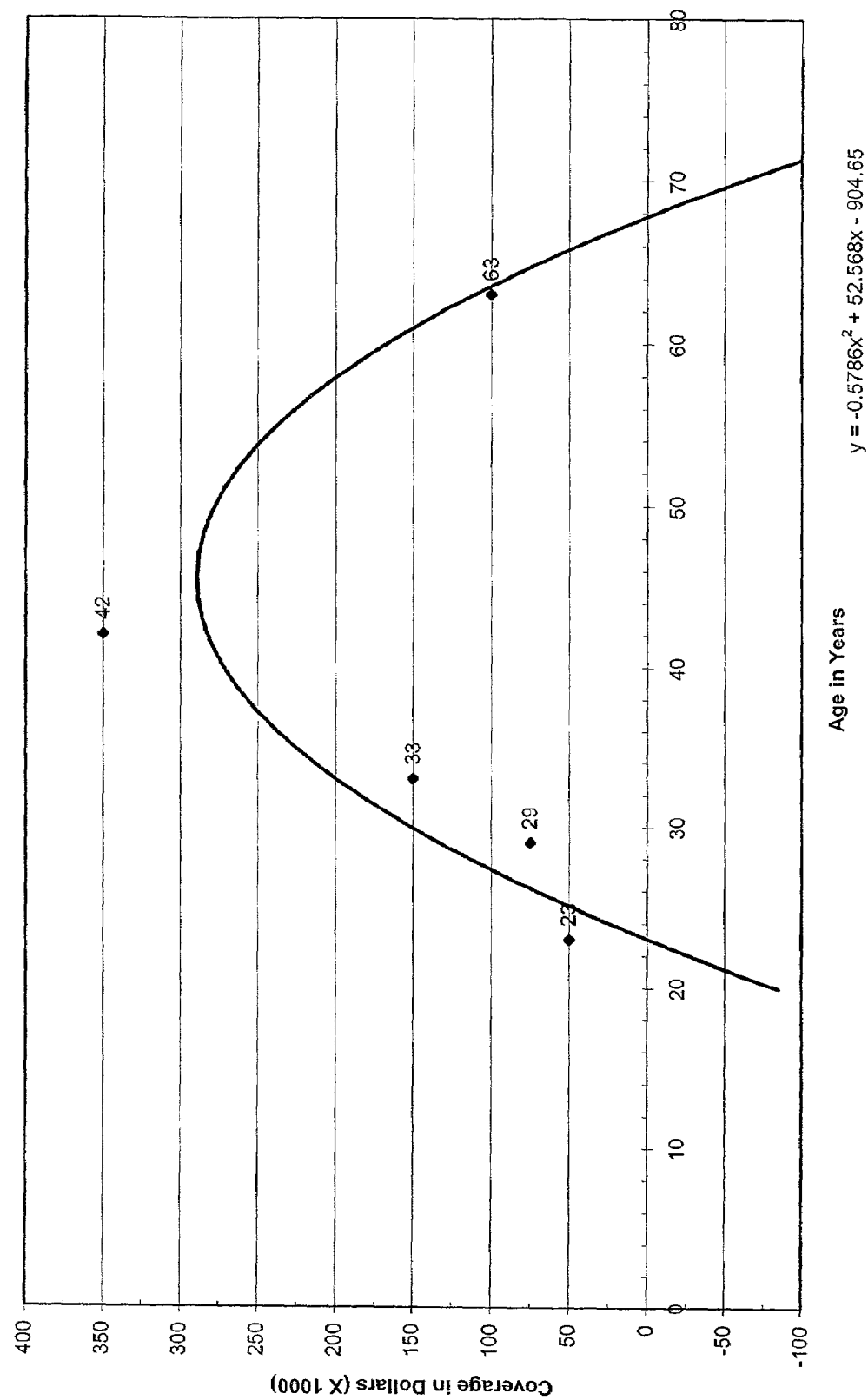
Figure 7:
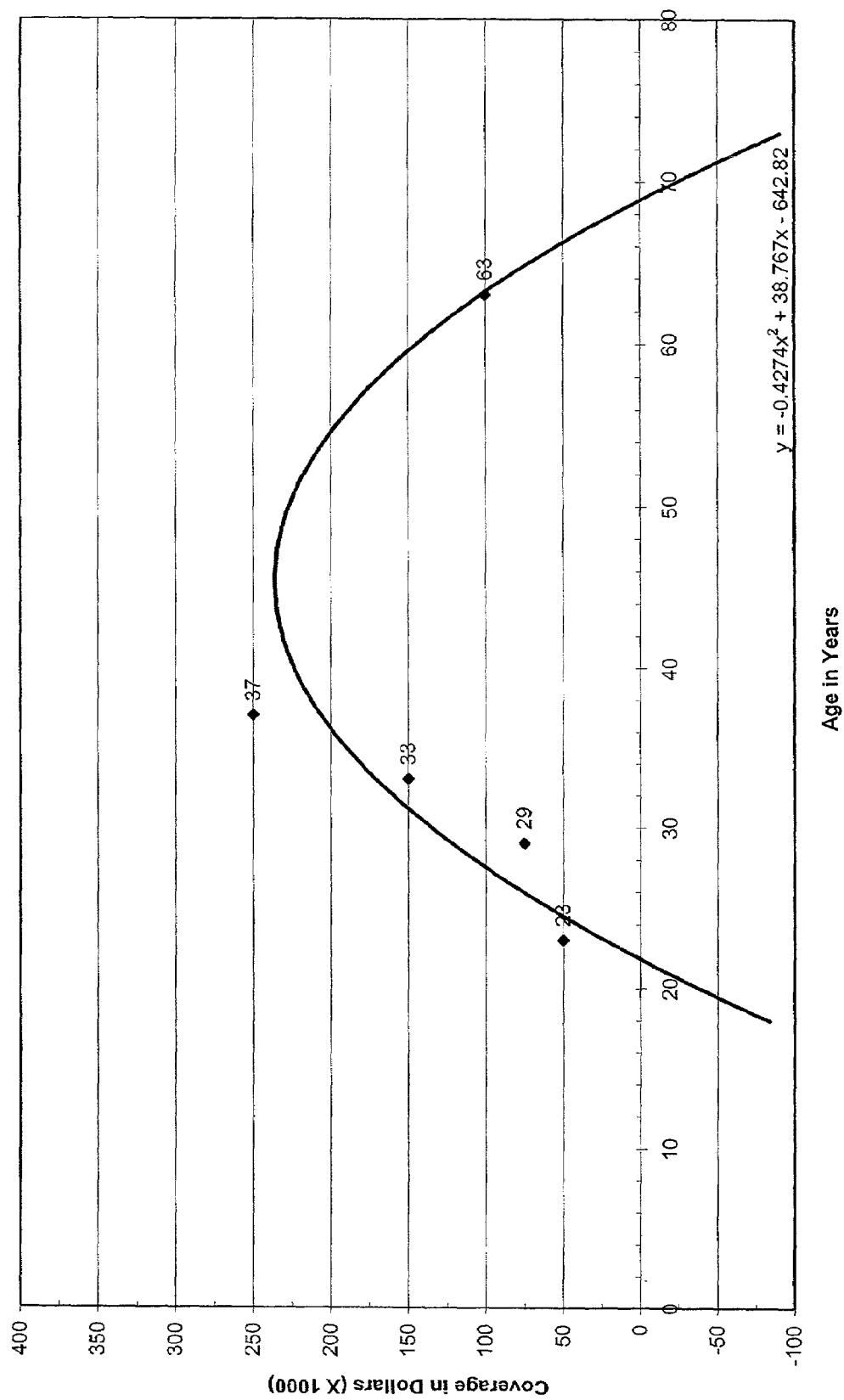

Table 2 and FIGS. 3 through 8 illustrate the method of the present invention in a much simplified form. In Table 2 and each of FIGS. 3–8, five of the six customers from Table 1 are "selected" to create the above-described subsets. Instead of using random samples, for the purpose of this example, the data points for a different one of the six customers is excluded from each subset. This is done because the small size of the complete set (six customers) prohibits a true and effective random sampling that would demonstrate the present invention; in a real situation, thousands or millions of data points pertaining to hundreds or thousands of characteristics might exist and thus a random sampling would function properly.

variance, those points that have high variances are identified as candidates for investigation as outliers. Referring to FIG. 3, the quadratic function of samples B, C, D, E, and F are plotted. Thus, as shown, the data points for Customer A, the insured who is age 23, having 50K of coverage, has been excluded. In FIG. 4, data points for Customer B have been excluded; in FIG. 5, data points for Customer C have been excluded; in FIG. 6, data points for customer D have been excluded; and in FIG. 7, data points for Customer E have been excluded. An analysis of each of these curves, while indicating slightly different estimated values for potential insured persons along the curve, do not differ significantly from the curve shown in FIG. 2 (which includes all six data points).

Figure 8:
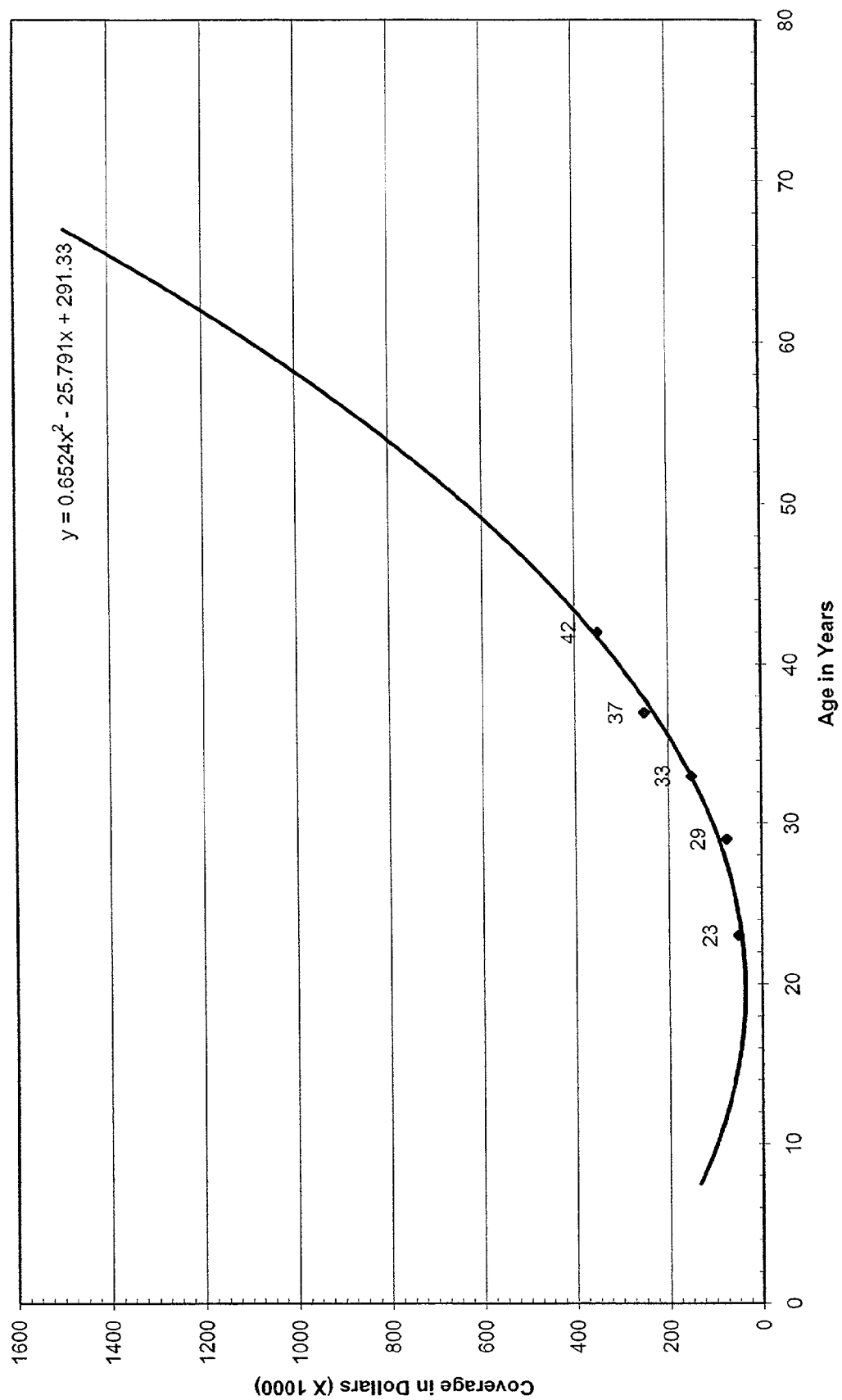

Referring now to FIG. 8, the data points for Customer F have been excluded, and is the curve for the remaining customer data points (A through E) differs significantly from the curve of FIG. 1 and the curves of FIGS. 3–7. One looking at the FIG. 8 curve would presume that as a person ages, the amount of insurance coverage that they obtain continues to increase.

From this simple example, it can be seen that by repeatedly sampling subsets from the data population and building new models, and then applying the models to the entire data population (thereby creating a probability distribution for the entire data population), an average prediction and the corresponding variance of that prediction can be derived. By using a non-linear model with enough degrees of freedom (e.g., quadratic, cubic, etc.) and a global fitting process (e.g., using all data points when applying each model), those points that are sensitive to inclusion/exclusion from the model can be readily identified. These sensitive data points are indicative of outliers. In the above example, the 63-year-old's insurance purchase is identified as an outlier and thus is identified as "unusual" and worthy of investigation. When sorting through thousands or millions of data records, identifying such outliers is extremely valuable.

A beneficial aspect of the present invention is self-evident by looking at the many dimensions (variables) that may be analyzed in the insurance industry. An insurance analyst, for example, might want to know the customer's:

Needs
Risk aversion
Cost sensitivity
Financial situation—ability to pay
Financial self confidence
Convenience versus cost trade off

TABLE 2

| Prediction from model built leaving out: | Customer A | Customer B | Customer C | Customer D | Customer E | Customer F |
|---|---|---|---|---|---|---|
| Customer A (Sample A) | −176.64 | 56.4899 | 174.3908 | 262.2766 | 329.9252 | 101.9176 |
| Customer B (Sample B) | 24.78218 | 153.0803 | 215.9017 | 260.5546 | 290.8212 | 107.9404 |
| Customer C (Sample C) | 5.808077 | 146.4996 | 215.7103 | 265.2543 | 299.5277 | 107.9104 |
| Customer D (Sample D) | −1.64803 | 133.245 | 200.0304 | 248.3013 | 282.6037 | 110.7689 |
| Customer E (Sample E) | 22.70059 | 121.9395 | 171.0011 | 206.3847 | 231.3793 | 102.9742 |
| Customer F (Sample F) | 43.24799 | 92.0402 | 150.6626 | 230.1604 | 358.8888 | 1255.735 |
| Average of Predictions | −13.6248 | 117.2157 | 187.9495 | 245.4886 | 298.8576 | 297.8744 |
| Variance | 6624.811 | 1348.899 | 711.8673 | 534.2966 | 1890.297 | 220210.2 |
| Maximum - minimum | 219.8876 | 96.59037 | 65.23907 | 58.8696 | 127.5095 | 1153.817 |

In Table 2, the quadratic function of each of the subsets is used to obtain predictions for each customer in the complete set, and the average, variance, and range of the predictions is also generated. By rank ordering the data points by their Technology affinity—do they prefer to talk to a person or happy to go online?
Loyalty
Value The following is a list of attributes that are used in the insurance industry to identify the above information to the analyst. It is not exhaustive and it is not intended to imply that attributes not on this list are not useful.

Demographic/Life Stage Variables
adults in the household
children in household
Presence of college age (18–22) member in household
members of household
Household income
Highest education level in the household
Presence of high school child
Head of household gender
Marital status
Presence of middle school child
Oldest principal driver
Presence of pre school child
Presence of young adult in household
Credit rating
Type of home
Market value of home
Home ownership status
Metropolitan/rural location
Length of residence
Live in grand parents
# of autos
Zip code
State
Census tract/block group/block Product Variables
policies by product grouping
Total premium by product grouping
Average premium by product grouping
Total household premium
Date of most recent product purchase
Date of first purchase
Product grouping of first purchase
claims
Date of most recent claim
$ amount of claims in last X years
terminated policies
terminated policies by product grouping
Date of most recent termination
Competitiveness rating by product by state
Savings due to multi line discount Coverage Choice Variables
# of coverages by coverage type
Limits chosen relative to default limit
Deductibles chosen relative to default Payment Choices
Payment option
Payment frequency Relationship Variables
Most recent mailing
Most recent service contact
Preferred service channel
Date of last review with customer of their insurance needs
Tenure with Company
Most recent contact
Household tenure with agent
Solicitation history Life Events
Birth of child
Change of address
Home purchase
Marriage
Age related e.g. go to college, retire As can be seen, there are numerous variables that go into insurance analysis, and identifying outliers and their significance has heretofore been a monumental task. The present invention renders the analysis much more useful, efficient, and productive. It is understood that the present invention is not limited to insurance analysis; instead, the present invention can be used in any situation involving analysis of a body of multi-dimensional data.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as in the permanent storage of a workstation operated by a data analyst. In a client/server environment, such software programming code may be stored with storage associated with a server. The software no programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of detecting outliers within a multidimensional data set, comprising the steps of:
    identifying a subset of said multidimensional data set;
    building a predictive model based on said identified subset;
    generating predicted values for each data point in said multidimensional data set based on said predictive model;
    repeating said identifying, building, and generating steps a predetermined number of iterations to generate a set of predicted values for each data point in said multidimensional data set based on each built predictive model;
    calculating an average predicted value for each data point in said multidimensional data set based on the generated predicted values;
    calculating the variance for each data point in said multidimensional data set;
    ranking the data points in said multidimensional data set based on the calculated variances; and
    identifying as outliers any data points in said multidimensional having variances that exceed a predetermined outlier threshold.

2. The method as set forth in claim 1, wherein said generated set of predicted values comprises a probability distribution.

3. The method of claim 1, wherein said multi-dimensional data set comprises insurance data, and wherein the presence of identified outliers indicates insurance fraud.

4. The method of claim 1, wherein said predictive model is built using a cubic radial basis function.

5. The method of claim 1, wherein said predictive model is built using a multi-quadric radial basis function.

6. A system of detecting outliers within a multidimensional data set, comprising:
   means for identifying a subset of said multidimensional data set;
   means for building a predictive model based on said identified subset;
   means for generating predicted values for each data point in said multidimensional data set based on said predictive model;
   means for repeating said identifying, building, and generating steps a predetermined number of iterations to generate a set of predicted values for each data point in said multidimensional data set based on each built predictive model;
   means for calculating an average predicted value for each data point in said multidimensional data set based on the generated predicted values;
   means for calculating the variance for each data point in said multidimensional data set;
   means for ranking the data points in said multidimensional data set based on the calculated variances; and
   means for identifying as outliers any data points in said multidimensional having variances that exceed a predetermined outlier threshold.

7. The system as set forth in claim 6, wherein said generated set of predicted values comprises a probability distribution.

8. The system of claim 6, wherein said multi-dimensional data set comprises insurance data, and wherein the presence of identified outliers indicates insurance fraud.

9. The system of claim 7, wherein said predictive model is built using a cubic radial basis function.

10. The system of claim 7, wherein said predictive model is built using a multi-quadric radial basis function.

11. A computer program product recorded on computer readable medium for detecting outliers within a multidimensional data set, comprising:
    computer readable means for identifying a subset of said multidimensional data set;
    computer readable means for building a predictive model based on said identified subset;
    computer readable means for generating predicted values for each data point in said multidimensional data set based on said predictive model;
    computer readable means for repeating said identifying, building, and generating steps a predetermined number of iterations to generate a set of predicted values for each data point in said multidimensional data set based on each built predictive model;
    computer readable means for calculating an average predicted value for each data point in said multidimensional data set based on the generated predicted values;
    computer readable means for calculating the variance for each data point in said multidimensional data set;
    computer readable means for ranking the data points in said multidimensional data set based on the calculated variances; and
    computer readable means for identifying as outliers any data points in said multidimensional having variances that exceed a predetermined outlier threshold.

12. The computer program product as set forth in claim 11, wherein said generated set of predicted values comprises a probability distribution.

13. The computer program product of claim 11, wherein said multi-dimensional data set comprises insurance data, and wherein the presence of identified outliers indicates insurance fraud.

14. The computer program product of claim 11, wherein said predictive model is built using a cubic radial basis function.

15. The computer program product of claim 11, wherein said predictive model is built using a multi-quadric radial basis function.

* * * * *